US011165810B2

(12) United States Patent
Khanna et al.

(10) Patent No.: US 11,165,810 B2
(45) Date of Patent: Nov. 2, 2021

(54) PASSWORD/SENSITIVE DATA MANAGEMENT IN A CONTAINER BASED ECO SYSTEM

(71) Applicant: International Business Machines Corporation, Armonk, NY (US)

(72) Inventors: Rashmi Khanna, Bangalore (IN); Magesh Kumar Sivaswamy, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 248 days.

(21) Appl. No.: 16/552,807

(22) Filed: Aug. 27, 2019

(65) Prior Publication Data

US 2021/0067537 A1 Mar. 4, 2021

(51) Int. Cl.
*H04L 29/06* (2006.01)

(52) U.S. Cl.
CPC ........ *H04L 63/1433* (2013.01); *H04L 63/145* (2013.01)

(58) Field of Classification Search
CPC ............... H04L 63/1433; H04L 63/145; H04L 63/0823; H04L 63/083; G06F 21/45
See application file for complete search history.

(56) References Cited

U.S. PATENT DOCUMENTS

| 9,521,115 | B1 | 12/2016 | Woolward | |
| 10,742,649 | B1* | 8/2020 | Hook, Jr. ............ | H04L 63/0876 |
| 2006/0167905 | A1* | 7/2006 | Liu ........................ | G06F 40/143 |
| 2012/0159166 | A1* | 6/2012 | Lee ........................ | H04L 9/3255 |
| | | | | 713/168 |
| 2014/0331060 | A1* | 11/2014 | Hayton ................... | G06F 21/31 |
| | | | | 713/186 |
| 2016/0259811 | A1 | 9/2016 | MacKay et al. | |

FOREIGN PATENT DOCUMENTS

| CN | 105915378 A | 8/2016 |
| WO | 2015138666 A1 | 9/2015 |

OTHER PUBLICATIONS

Zhang et al., Harbormaster: Policy Enforcement for Container, IEEE 7th International Conference on Cloud Computing Technology and Science, 2015.

* cited by examiner

*Primary Examiner* — Ali S Abyaneh
(74) *Attorney, Agent, or Firm* — Garg Law Firm, PLLC; Rakesh Garg; Christopher Pignato (57) ABSTRACT

A configuration map to be transmitted to a container manager within a network is compiled on a client device and transmitted to the container manager managing a cluster of containers within the network. The configuration map is transmitted from the container manager to a validation service endpoint to attempt to validate the compiled configuration map. In response to the transmitting the configuration map from the container manager, a determination is caused to occur at the validation service endpoint whether the configuration map should be validated by the validation service endpoint. The configuration map is received from the validation service endpoint with a new environmental variable, when the validation service endpoint validates the configuration map.

19 Claims, 7 Drawing Sheets

PASSWORD/SENSITIVE DATA MANAGEMENT IN A CONTAINER BASED ECO SYSTEM

TECHNICAL FIELD

The present invention relates generally to information validation in a cloud network. More particularly, the present invention relates to providing remote validation scripts at an organization's information technology (IT) validation service endpoint(s) to validate the configuration maps and secrets for the cluster of containers within the cloud network from a central location.

BACKGROUND

Currently, in order to validate each value of a configuration map/secret, a user application configures a configuration map/secret to include a combination of a username, password, uniform resource locator (URL), port, authentication token (token), and authentication certificate (certificate) onto a client device such as a desktop computer. The user application transmits the configuration map/secret through the client device (desktop computer, for example) onto an online network, or a cloud network containing a cluster of containers. The cluster of containers are a cluster of local packaging mechanisms which can receive applications and variables from a container manager within the cloud network. A container manager in the cloud network manages the cluster of containers within the cloud network. The container manager receives the configuration map/secure and pushes each value of the configuration map/secret to the cluster of containers within the cloud network.

Validating a value of the configuration map requires applying an organization's code to a value of the configuration map after retrieving the value (such as password, username, etc.) from the configuration map. For example, an organization desires for the values of the configuration map to adhere to the organization's policies. Accordingly, if the configuration map includes a password, and the organization desires for the password to adhere to a specific password policy, a code or software patch from the organization is applied to the password when attempting to validate the password. Moreover, the code from the organization is applied each time whenever the password is retrieved. Accordingly, a software patch or code unique to the organization is applied onto a value of the configuration map when a value of the configuration map is retrieved. Different organizations will have different policies for password policy, and authentication services, database services and cache services, etc. Accordingly, a different code will be applied by another organization when validating a value of the configuration map configured by a user application. As described above, the current validation requires code to be applied to a value of the configuration map after retrieving the value such as the password, and duplicating that logic every time that value (such as password) is used.

A user with cluster administration privilege updates and creates information with respect to policies for password, authentication, and username as part of the application life cycle. In addition, when the container manager attempts to push new values of the configuration map to the cluster of containers, one or more of the containers within the cluster has to be deleted and recreated to allow the container manager to push the new values from the configuration map onto the containers.

SUMMARY

The illustrative embodiments provide a method, computer program product and computer system for validating configuration maps and secrets in a container system in a computing device. An embodiment includes configuring a configuration map onto a client device, the configuration map to be transmitted to a container manager within a network. The embodiment transmitting the configuration map to the container manager managing a cluster of containers within the network. The embodiment also includes transmitting the configuration map from the container manager to a validation service endpoint to attempt to validate the configuration map compiled Further, causing, responsive to the transmitting the configuration map from the container manager, at the validation service endpoint, a determination whether the configuration map should be validated by the validation service endpoint. The embodiment also includes receiving from the validation service endpoint one option of (i) the configuration map with a new environmental variable and (ii) the configuration map without the new environmental variable, the received option being selected based on whether the validation service endpoint validated the configuration map compiled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

A current problem that exists with current validation techniques are that a code from the organization has to be applied to a value of the configuration map each time that value is used. A validation for each value of the configuration map from specific location is currently unavailable. Another problem that exists is that to allow a new value of the configuration map to be pushed to the containers in the cloud network, the containers in the cloud network would need to be deleted and created to accordingly receive the new value.

The illustrative embodiments relate to a method, system and computer program product for validating a configuration map. The illustrative embodiments recognize that the present methods and techniques for validating configuration maps suffer from several problems described above. For example, a need exits to validate each value of the configuration map from one location without having to provide different cumbersome code or logic for a value configured in the configuration map each time that value is used. In addition, a need exits to validate the configuration map from one location without requiring the cluster of containers within the cloud network to be deleted and recreated to receive a new variable from the configuration map. Enforcing the validation policy from one location ensures that the environmental variable from the configuration map always adhere to the organization's IT policy.

The illustrative embodiments used to describe the invention generally address and solve the above-described problem of providing a location to validate a configuration map without having to apply an organizational code to validate each value of the configuration map each time that value is used. In addition, the validation location also eliminates the need for the cluster of containers in the cloud network to be deleted and recreated to allow the container manager to push a new value from the configuration map to the containers.

In one embodiment, a user application configures configuration maps/secrets that include a combination of a username, password, token, certificate, URL, and port. The user application transmits the configuration map to a container manager within a network (such as a cloud network). The cloud network includes the container manager managing a cluster of containers within the cloud network. The container manager transmits the configuration map to a validation service endpoint that is configured according to an embodiment described herein to validate the configuration map compiled.

A validation service endpoint validates the configuration map at the organization's service endpoint. The validation service endpoint validate the configuration map using a validation script. The validation script is a simple script or a collection of scripts. The validation scripts include a PORT_VALIDATION_SCRIPT, PASSWORD_VALIDATION_SCRIPT, URL_VALIDATION_SCRIPT, USERNAME_VALIDATION_SCRIPT, CERTIFICATE_VALIDATION_SCRIPT, and a TOKEN_VALIDATION_SCRIPT. The validation script is set to be unique to each organization implementing the validation service endpoint. As a result, the validation script provides customized validation at the validation service endpoint. Further, the validation service endpoint updates the validation script when so required.

A validation service endpoint determines whether to validate the configuration map compiled. The validation service endpoint indicates "True" to the container manager when the configuration map is validated. In addition, the validation service endpoint indicates "False" to the container manager when the configuration map has not been validated. The validation service endpoint also transmits a modified configuration map back to the container manager after determining whether to validate the configuration map. The validation service endpoint forms the modified configuration map by augmenting the configuration map with at least one new environmental variable resulting from the validation operation performed on the configuration map. In an embodiment, the configuration map will include at least one new value to indicate that the configuration map has been validated. For example, the validation service endpoint according to one embodiment uses the organization's validation policy to determine which value in the configuration map should be validated to satisfy a validation requirement of the organization. The receiving of the modified configuration map enables the container manager to push each new environmental variable into each container in the cloud network. The cloud network contains numerous containers relying on each new environmental variable from the modified configuration map. The new environmental variables include ENV_VALIDATE_PASSWD=PASSWD_ENDPOINT, ENV_VALIDATE_PORT=PORT_ENDPOINT, ENV_VALIDATE_URL=URL_ENDPOINT, ENV_VALIDATE_TOKEN=TOKEN_ENDPOINT, ENV_VALIDATE_UNAME=UNAME_ENPOINT, and ENV_VALIDATE_CERTIFICATE=CERTIFICATE_ENDPOINT. Each new environmental variable indicates that a value within the configuration map has been validated.

An illustrative embodiment provides a method for a user application to configure a configuration map consisting of a username and a password. The user application transmits the configuration map to a container manager in a cloud network. The container manager manages a cluster of containers within the cloud network. The container manager transmits the configuration map to an organization's validation service endpoint to attempt to validate the configuration map compiled. Still in other illustrative embodiments, multiple organizations provide the validation service endpoint to validate the configuration map. Further, in other illustrative embodiments, different departments within the same organization implement the validation service endpoint to validate the configuration map accordingly. The validation service endpoint thereby validates the configuration map received from the container manager using a validation script. The validation script includes a PASSWORD_VALIDATION_SCRIPT and a USERNAME_VALIDATION_SCRIPT. The validation service endpoint transmits the validated configuration map back to the container manager within the cloud network. The container manager pushes the each new environmental variable ENV_VALIDATE_PASSWD=PASSWD_ENDPOINT and ENV_VALIDATE_UNAME=UNAME_ENPOINT into each container accordingly.

An embodiment illustrates that a user application configures another configuration map when the validation service endpoint does not validate the first configuration map compiled. The validation service endpoint does not validate the configuration map consisting of the username and password. The validation service endpoint indicates "False" to the container manager and returns the configuration map to the container manager without a new value for the configuration map when the validation service endpoint does not validate the configuration map compiled. The organization upgrades its validation requirement for the validation service endpoint. The validation requirement is upgraded in response to the organization receiving a vulnerability report on a new algorithm and a new virus. Accordingly, the organization decides to make the validation requirement to validate a configuration map more stringent as a result. The validation requirement for the validation service endpoint is also continuously upgraded. Further, the organization also upgrades its validation requirement in the absence of receiving a vulnerability report as well. In response to the first configuration map not being validated, the user application configures another configuration map. The upgraded configuration map consists of a certificate in addition to the username and password. The user application transmits the upgraded configuration map to the container manager. The container manager transmits the configuration map to the validation service endpoint. The validation service endpoint validates the upgraded configuration map, and transmits the modified configuration map back to the container manager with a new variable for each value validated by the validation service endpoint. The container manager pushes each new environmental variable to each container within the cluster accordingly. The new environmental variables include
ENV_VALIDATE_PASSWD=PASSWD_ENDPOINT, ENV_VALIDATE_UNAME=UNAME_ENPOINT, and ENV_VALIDATE_CERTIFICATE=CERTIFICATE_ENDPOINT.

In an embodiment, a user application configures a different combination of a configuration map than that described above. The user application configures a configuration map to consist of a username, password, port and a URL. The user application transmits the configuration map to the container manager within the cloud network. The container manager transmits the configuration map to the organization's validation service endpoint. The validation service endpoint determines not to validate the configuration map based on its validation requirement currently in use. In response, the user application configures another configuration map consisting of the username, password, port, URL, certificate, and token. The user application transmits the configuration map to the container manager. The container manager transmits the configuration map for validation to the validation service endpoint. The validation service endpoint determines that the upgraded configuration map meets its current validation requirement, and validates each value of the configuration map using a validation script. The validation scripts include: PORT_VALIDATION_SCRIPT, PASSWORD_VALIDATION_SCRIPT, URL_VALIDATION_SCRIPT, USERNAME_VALIDATION_SCRIPT, CERTIFICATE_VALIDATION_SCRIPT, and TOKEN_VALIDATION_SCRIPT. The validation service endpoint transmits the modified configuration map back to the container manager. The container manager pushes each new environmental variable onto each container in the cloud network. The new environmental variables include:
ENV_VALIDATE_PASSWD=PASSWD_ENDPOINT,
ENV_VALIDATE_UNAME=UNAME_ENDPOINT,
ENV_VALIDATE_PORT=PORT_ENDPOINT,
ENV_VALIDATE_URL=URL_ENDPOINT,
ENV_VALIDATE_CERTIFICATE=CERTIFICATE_ENDPOINT, and
ENV_VALIDATE_TOKEN=TOKEN_ENDPOINT.

A method is provided for a user application to configure a configuration map and transmit the configuration map to a container manager managing a cluster of containers in a cloud network. The container manager transmits the configuration map to a validation service endpoint to attempt to validate the configuration map. The validation service endpoint determines whether to validate the configuration map, and also transmits one of the original configuration map and a modified configuration map back to the container manager within the network. A computer program usable product and a computer system is also provided for a user application to configure a configuration map, and have the configuration map transmitted to a container manager within a network. The container manager transmits the configuration map to the validation service endpoint for validation.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for automatic searching of object databases using a variety of components that can be purposed or repurposed to provide a described function within a data processing environment, and such adaptations are contemplated within the scope of the illustrative embodiments.

The illustrative embodiments are described with respect to certain types of steps, applications, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
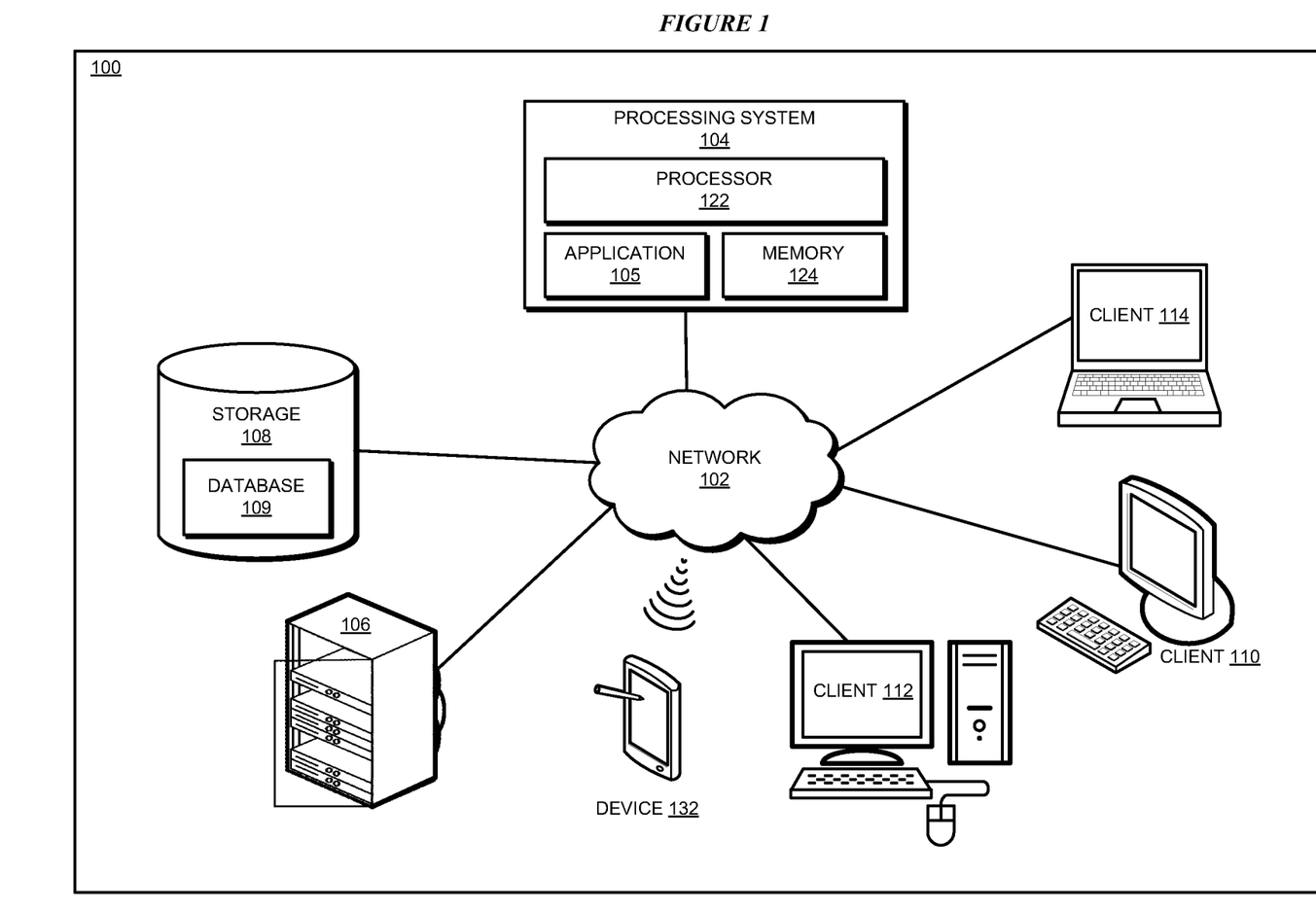
FIG. 1 depicts a block diagram of a network of data processing systems in which illustrative embodiments may be implemented.
Figure 2:
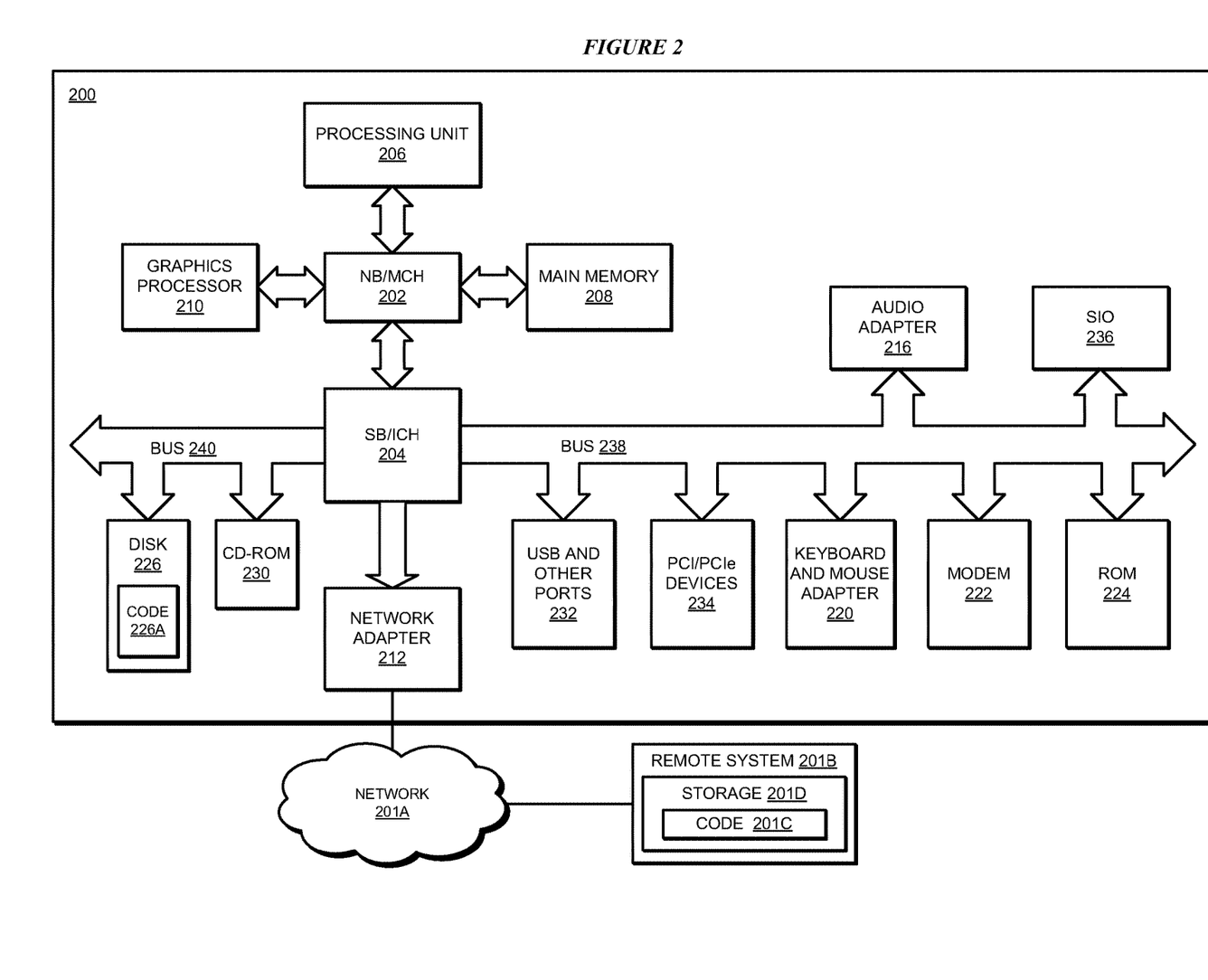
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network in which the illustrative embodiments are be implemented. Data processing environment 100 includes network 102. Network 102 is the medium used to provide communications links between various devices and computers connected together within data processing environment 100. Network 102 includes connections, such as wire, wireless communication links, or fiber optic cables.

Clients or servers are only example roles of certain data processing systems connected to network 102 and are not intended to exclude other configurations or roles for these data processing systems. Processing system 104 couples to network 102. Software applications may execute on any data processing system in a data processing environment 100. Any software application described as executing in processing system 104 in FIG. 1 is configured to execute in another data processing system in a similar manner. Any data or information stored or produced in processing system 104 in FIG. 1 is configured to be stored or produced in another data processing system in a similar manner. A data processing system, such as processing system 104, may contain data and may have software applications or software tools executing computing processes thereon.

Server 106 couples to network 102 along with storage unit 108. Storage unit 108 includes a database 109 configured to store neural network training data as described herein with respect to various embodiments. Server 106 is a data processing system.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Data processing systems 106, 110, 112, and 114 also represent example nodes in a cluster, partitions, and other configurations suitable for implementing an embodiment.

Device 132 is an example of a computing device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Server 106, storage unit 108, processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to a processor 122. Processor 122 may include its own data, boot files, operating system images, and applications. Data processing environment 100 may include additional memories and other devices that are not shown. Memory 124 includes application 105 that may be configured to implement one or more of the processor functions described herein for correcting bias on a computing system in accordance with one or more embodiments. Data processing environment 100 may include additional memories, processors and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, the data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as processing system 104, server 106, or clients 110, 112, and 114 in FIG. 1, or another type of device in which computer usable program code or instructions implementing the processes may be located for the illustrative embodiments.

Data processing system 200 is also representative of a data processing system or a configuration therein, in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system. The main memory 208 is manifested as a virtualized instance of all or some portion of main memory 208 that may be available in the host data processing system. The disk 226 is manifested as a virtualized instance of all or some portion of disk 226 that may be available in the host data processing system. The host data processing system in such cases is represented by data processing system 200.

Figure 3:
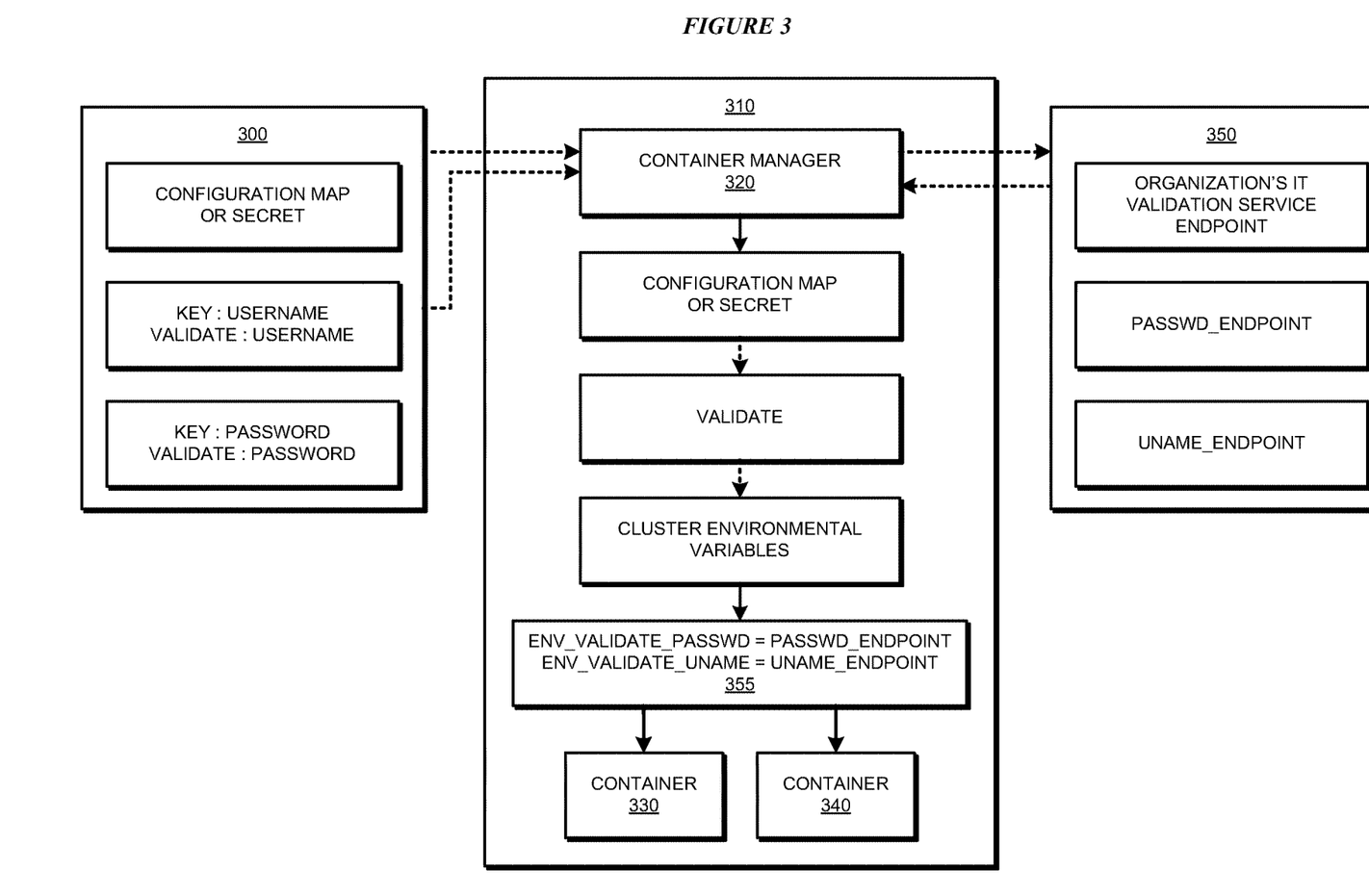
FIG. 3 depicts a flow chart of a user application compiling configuration maps and secrets to be validated in accordance with an illustrative embodiment.

With reference to FIG. 3, this figure a diagram of a flow diagram of a user application configuration a configuration map to be validated by an organization's information technology validation service endpoint is depicted within the data processing system 200. The user application configures a configuration map and transmits the configuration map to a container manager within a cloud network. The cloud network includes the container manager managing a cluster of containers in the cloud network. The container manager within the cloud network transmits the configuration map to the organization's IT validation service endpoint to have the configuration map and validated accordingly.

Still with respect to FIG. 3, the user application compiles a configuration map and 300. The configuration map includes any one of a username, a port, a URL, a password, authentication token (token), and an authentication certificate (certificate). In illustrative embodiments, the configuration map 300 includes a combination of a username, port, URL, password, token and certificate. In an embodiment, the user application configures a configuration map 300 consisting of a username and password. The user application transmits the configuration map 300 onto a cloud network 310. The cloud network 310 includes a container manager 320 and cluster of containers 330 and 340 in a cloud network. Two containers are depicted in an illustrative embodiment. Still in other illustrative embodiments, the cluster of containers includes more than the two containers illustrated. The container manager 320 receives the configuration map 300 from the user application. The container manager 320 attempts to have the configuration map 300 including a username and password validated accordingly. Instead of having one of the containers 330, 340 validate the configuration map, the container manager 320 sends the configuration map to an organization's IT validation service endpoint 350 to validate the configuration map 300 accordingly. In other illustrative embodiments, multiple organizations provide the validation service endpoint 350 to validate the configuration map 300. Still in other illustrative embodiments, different departments of the same organization provide the validation service endpoint 350. In an embodiment, a single organization also provides the validation service endpoint 350.

With respect to FIG. 3, the validation service endpoint 350 has at least one validation requirement required to validate the configuration map 300. The validation service endpoint 350 receives the configuration map 300 from the container manager 320. The validation service endpoint 350 includes a "PASSWD_ENDPOINT" and "UNAME_ENDPOINT." In response, the validation service endpoint 350 validates the configuration map 300 and indicates "true" to the container manager 320 for the validation of the configuration map 300. A validation script validates each value of the configuration map 300. The validation scripts include PASSWORD_VALIDATION_SCRIPT and USERNAME_VALIDATION_SCRIPT accordingly. The container manager 320 receives the modified configuration map 300 from the validation service endpoint 350, and pushes the new environmental variables 355 into the containers 330 and 340 as a result of the successful validation of the configuration map 300. The new environmental variables 355 include "ENV_VALIDATE_PASSWD=PASSWD_ENDPOINT" and "ENV_VALIDATE_UNAME=UNAME_ENDPOINT." Both of the containers 330 and 340 receive the new environmental variables. Still in other illustrative embodiments, more environmental variables are be pushed to the containers should the configuration map 300 consist of Ports, URLs, tokens, and certificates.

Figure 4:
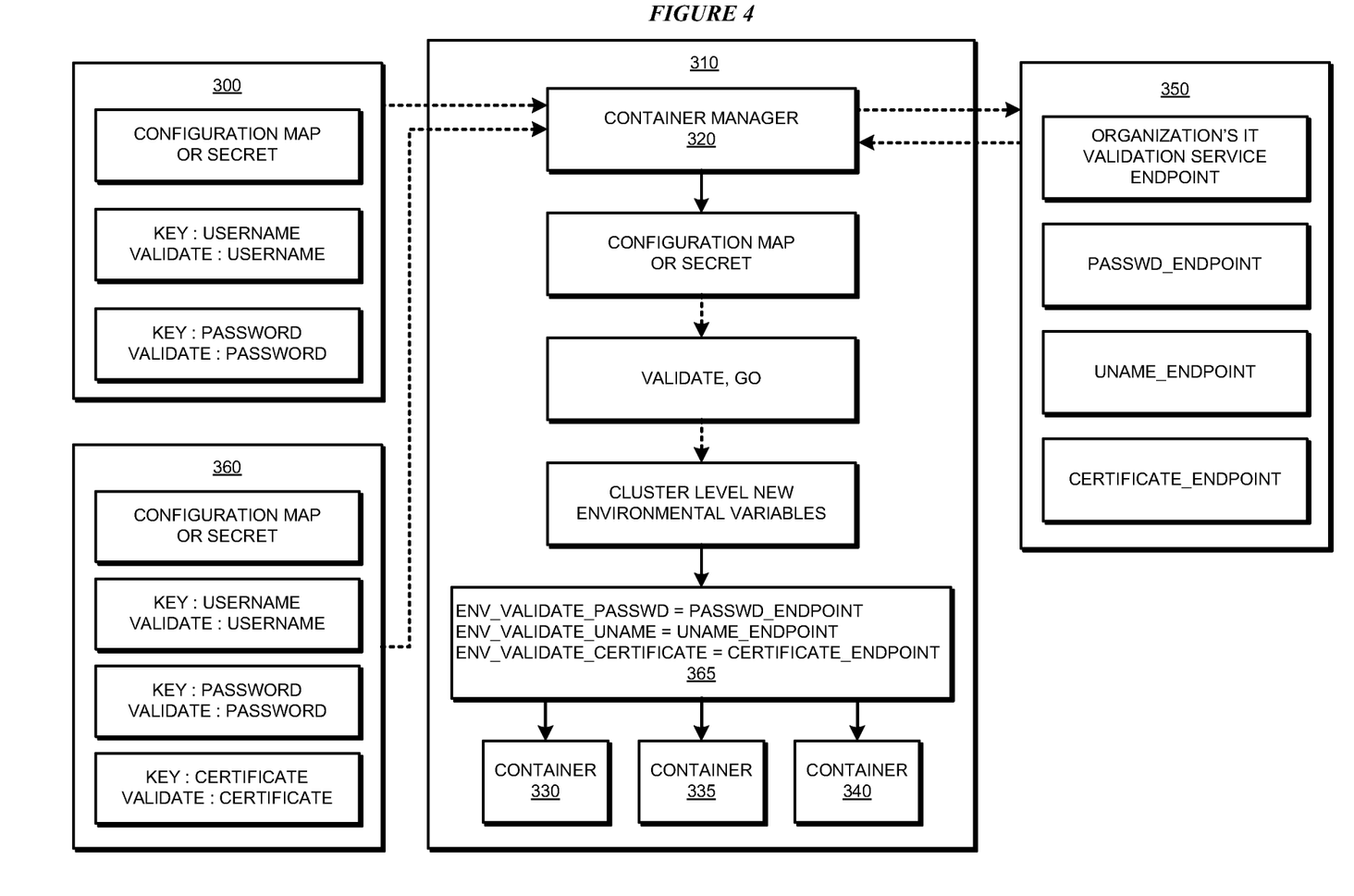
FIG. 4 depicts a flow diagram of a user application compiling configuration maps and secrets to be validated in accordance with an illustrative embodiment.

With reference to FIG. 4, a flow diagram depicting when the configuration map 300 illustrated in FIG. 3 is not validated by the validation service endpoint 350 is depicted. The validation service endpoint 350 also determines if the configuration map 300 is malicious and not be validated. The validation service endpoint 350 of the organization accordingly does not validate the configuration map 300 in such instances. The organization also determines to make the validation requirement more stringent on its own accord. The organization also updates the validation requirement in response to receiving a vulnerability report on a suspicious algorithm and virus. The validation service endpoint 350 also receives and is aware of a vulnerability report that indicates a suspicious algorithm or virus. Further, as previously mentioned, different organizations have different policies and requirements for the password and username. The validation service endpoint 350 also accordingly does not validate the password and username from the container manager 320 based on the current validation requirement in place. In response to not having a configuration map validated, the user application will configure another combination of the configuration map 300 to include one or more additional variables described above.

Still with reference to FIG. 4, the user application configures an upgraded configuration map 360 to include at least one more additional value than the configuration map 300 described above. In an illustrative embodiment, the second configuration map 360 includes a certificate in addition to the username and password. The user application transmits the configuration map 360 to the container manager 320. The container manager 320 transmits the configuration map 360 to the validation service endpoint 350. The validation service endpoint 350 includes a "PASSWD_ENDPOINT," "UNAME_ENDPOINT" and a "CERTIFICATE_ENDPOINT." The validation service endpoint 350 provides the validation script to validate each value of the configuration map 360. The validation script for each value of the configuration map is a customized validation and includes a PASSWORD_VALIDATION_SCRIPT, USERNAME_VALIDATION, and a CERTIFICATE_VALIDATION. The container manager 320 receives the modified configuration map 360 from the validation service endpoint 350, and pushes the new environmental variables 365 to the cluster of containers 330, 335, and 340. The new environmental variables 365 include ENV_VALIDATE_PASSWORD=PASSWORD_ENDPOINT, ENV_VALIDATE_UNAME=UNAME_ENDPOINT, and ENV_VALIDATE_CERTIFICATE=CERTIFICATE_ENDPOINT. Each container 330, 335 and 340 within the cloud network 310 receives the environmental variables 365 accordingly.

Figure 5:
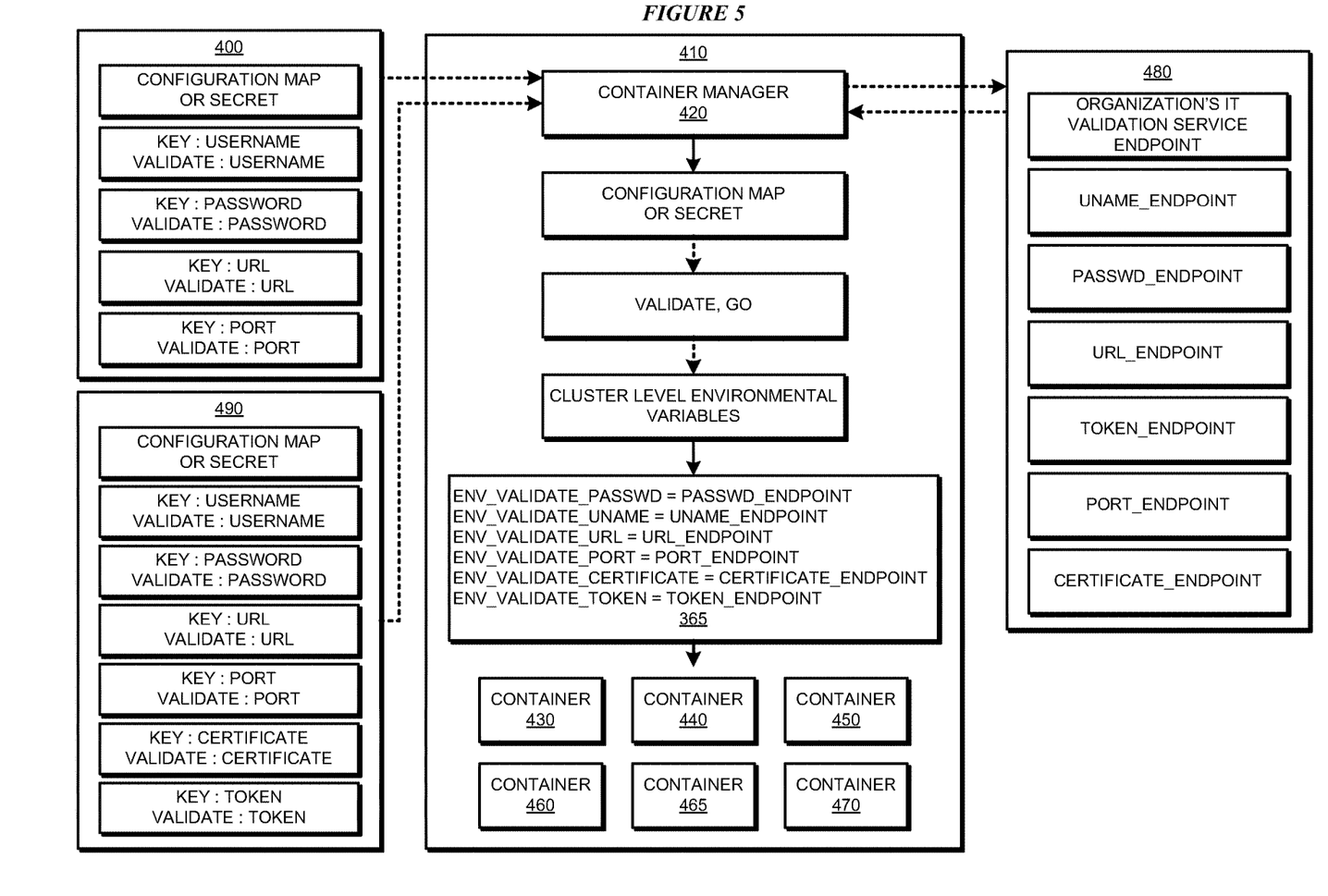
FIG. 5 depicts a flow diagram of a user application compiling configuration maps and secrets to be validated in an accordance with an illustrative embodiment.

With reference to FIG. 5, a user application configures a different configuration map than what is depicted above in FIGS. 3 and 4. As mentioned above, the organization utilizing the validation service endpoint continuously applies a more stringent standard to validate the configuration map that the user application configures, and which is transmitted to the validation service endpoint by the container manager.

Still with respect to FIG. 5, the user application compiles a configuration map 400 to include: a username, password, port and a URL. The user application transmits the configuration map 400 to a container manager 420 within a cloud network 410. The cloud network 410 includes a cluster of containers 430, 440, 450, 460, 465, 470. Still in other illustrative embodiments, the cloud network 410 includes more containers accordingly. The container manager 420 transmits the configuration map 400 to the validation service endpoint 480. The organization administering the validation service endpoint 480 upgrades the validation requirement for the configuration map. The organization applies a stricter validation requirement in response to receiving a vulnerability report on a suspicious virus and algorithm. The organization also applies a more stringent validation requirement for configuration maps in the absence of receiving a vulnerability report. The container manager 420 sends the configuration map 400 to the validation service endpoint 480 for validation. However, the validation service endpoint 480 thereby does not validate the configuration map 400, and indicates "false" to the container manager 420 as a result. The validation service endpoint 480 transmits the configuration map 400 back to the container manager 420 without a new environmental variable. The container manager 420 thereby does not push a new environmental variable to the containers 430, 440, 450, 460, 465, and 470.

Still with respect to FIG. 5, the user application compiles another configuration map 490 consisting of the username, password, port, URL, certificate, and token. In response to the stricter validation requirement of the validation service endpoint 480, the user application configures the configuration map 490 to meet the upgraded requirement of the validation service endpoint 480 accordingly. The user application transmits the updated configuration map 490 to the container manager 420. The container manager 420 transmits the upgraded configuration map 490 to the validation service endpoint 480 to enable the upgraded configuration map 490 to be validated. The validation service endpoint 480 includes a "UNAME_ENDPOINT," "PASSWD_ENDPOINT," "URL_ENDPOINT," "TOKEN_ENDPOINT," "PORT_ENDPOINT," and "CERTIFICATE_ENDPOINT."

With respect to FIG. 5, the validation service endpoint 480 provides a validation script to validate each value of the upgraded configuration map 490 accordingly. The validation scripts include USERNAME_VALIDATION, PASSWORD_VALIDATION, PORT_VALIDATION, URL_VALIDATION, CERTIFICATE_VALIDATION, and TOKEN_VALIDATION. The validation service endpoint 480 transmits the modified configuration map 490 back to the container manager 420 with the new environmental variables 365. The container manager 420 pushes the new environmental variables 365 to the cluster of containers 430, 440, 450, 460, 465, and 470. The new environmental variables 365 include ENV_VALIDATE_PASSWD=PASSWD_ENDPOINT, ENV_VALIDATE_UNAME=UNAME_ENDPOINT, ENV_VALIDATE_PORT=PORT_ENDPOINT, ENV_VALIDATE_CERTIFICATE=CERTIFICATE_ENDPOINT, ENV_VALIDATE_URL=URL_ENDPOINT, and ENV_VALIDATE_TOKEN=TOKEN_ENDPOINT. As necessary, the user application also repeats the process and configures another configuration map to be validated by the validation service endpoint 480, and so forth.

Figure 6:
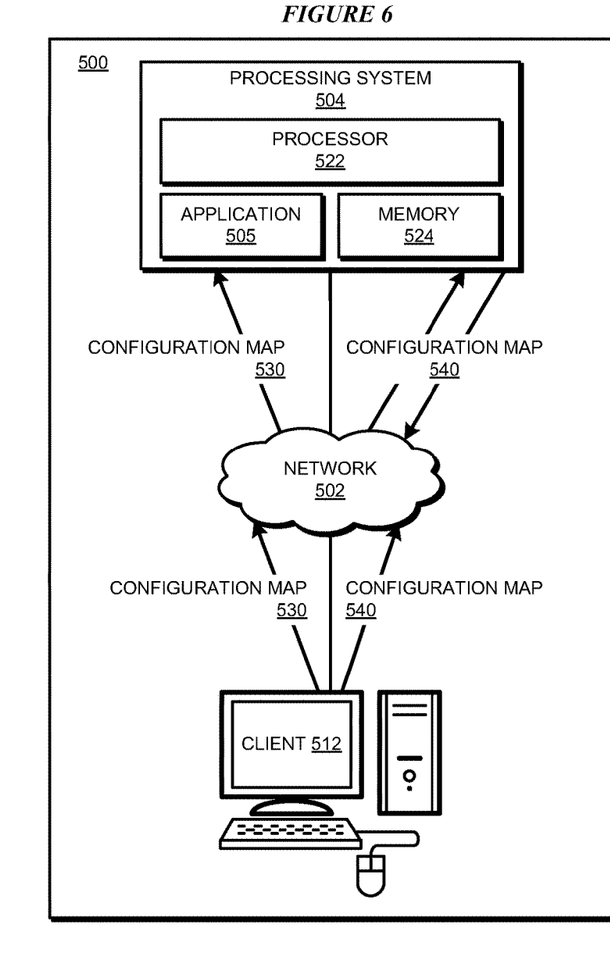
FIG. 6 depicts a block diagram of a user application compiling configuration maps and secrets to be validated in accordance with an illustrative embodiment.

Referring to FIG. 6, an illustrative embodiment using a data processing system 500 is depicted. The data processing system 500 includes a processing system 504 and a cloud network 502. The processing system 504 includes a processor 522, application 505, and memory 524. The network 502 is coupled to client device 512. The user application configures a configuration map 530 onto the client device 512. The configuration map 530 includes a username, password, and URL. The client device 512 transmits the configuration map 530 to the cloud network 502. The cloud network 502 includes a container manager and a cluster of containers. The container manager within the cloud network 502 transmits the configuration map 530 to the processing system 504. An organization's validation service endpoint is included within the processing system 504. The configured validation requirement of the validation service endpoint prevents the configuration map 530 from being validated. As described above, the validation requirement is upgraded in response to a received vulnerability report described above. The organization or organization administrator also continuously upgrades the validation requirement for the validation service endpoint as well. In response, the user application configures an upgraded configuration map 540.

Still with respect to FIG. 6, the user application configures the upgraded configuration map 540 to consist of a username, password, URL, certificate, and token. The client device 512 transmits the upgraded configuration map 540 to the cloud network 502. The container manager within the cloud network 502 transmits the configuration map 540 to the validation service endpoint within the processing system 504. The validation service endpoint within the processing system 504 validates the configuration map 540 with a validation script for each value of the configuration map 540. The validation scripts include USERNAME_VALIDATION, PASSWORD_VALIDATION, URL_VALIDATION, CERTIFICATE_VALIDATION, and TOKEN_VALIDATION.

The processing system 504 transmits the modified configuration map 540 to the container manager in the cloud network 502. The container manager within the cloud network 502 pushes each new environmental variable consisting of "ENV_VALIDATE_UNAME=UNAME_ENDPOINT, ENV_VALIDATE_PASSWD=PASSWD_ENDPOINT, ENV_VALIDATE_CERTIFICATE=CERTIFICATE_ENDPOINT, ENV_VALIDATE_URL=URL_ENDPOINT and ENV_VALIDATE_TOKEN=TOKEN_ENDPOINT" to the cluster of containers within the cloud network 502.

Figure 7:
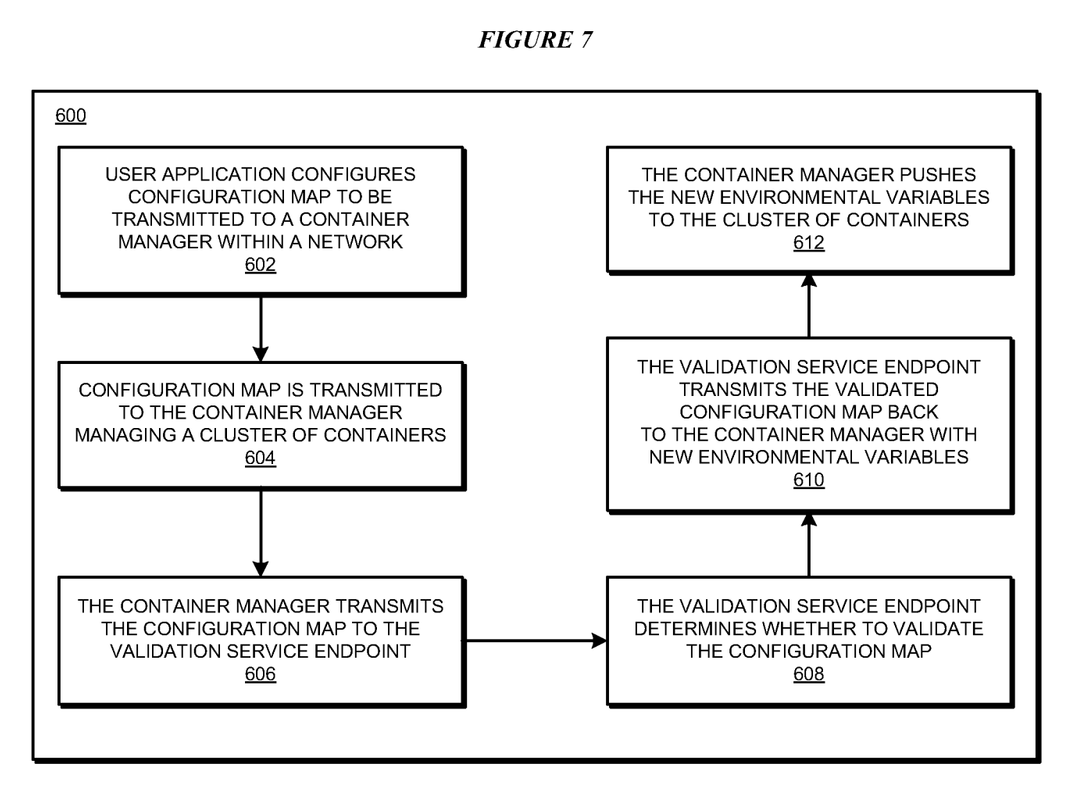
FIG. 7 depicts a flow chart of a user application compiling configuration maps and secrets to be validated in accordance with an illustrative embodiment.

With respect to FIG. 7, the steps of process 600 are carried out in FIG. 7. A user application configures a configuration map onto a client device, and has the configuration map transmitted to a container manager managing a cluster of containers in a cloud network. The container manager attempts to have the configuration map be validated by an organization's validation service endpoint within the network. At block 602, a user application compiles a configuration map onto a client device to be transmitted to a container manager within a cloud network. At block 604, the configuration map is transmitted to the container manager managing a cluster of containers within the cloud network. At block 606, the container manager transmits the configuration map to an organization's validation service endpoint to attempt to have the validation service endpoint validate the configuration map which the user application has configured. At block 608, the validation service endpoint determines whether the configuration map meets the current validation requirement. The validation service endpoint accordingly validates the configuration map. In the alternative, the validation service endpoint does not validate the configuration map compiled by for the reasons described above in FIGS. 4-6. At block 610, the validation service endpoint transmits the modified configuration map back to the container manager in the cloud network with the new environmental variables. In the alternative, the validation service endpoint transmits the original configuration map back to the container manager without the new environmental variables when the configuration map is not validated. At block 612, upon receiving the modified configuration map, the container manager pushes each new environmental variable to the cluster of containers. The new environmental variables include ENV_VALIDATE_UNAME=UNAME_ENDPOINT, ENV_VALIDATE_PASSWD=PASSWD_ENDPOINT, ENV_VALIDATE_CERTIFICATE=CERTIFICATE_ENDPOINT, ENV_VALIDATE_PORT=PORT_ENDPOINT, ENV_VALIDATE_URL=URL_ENDPOINT and ENV_VALIDATE_TOKEN=TOKEN_ENDPOINT accordingly.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented methods are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure.

The present invention may be a method, apparatus and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    compiling a configuration map onto a client device, the configuration map to be transmitted to a container manager within a network;
    transmitting the configuration map to the container manager managing a cluster of containers within the network;
    transmitting the configuration map from the container manager to a validation service endpoint to attempt to validate the configuration map;
    causing, responsive to the transmitting the configuration map from the container manager, at the validation service endpoint, a determination whether the configuration map should be validated by the validation service endpoint;
    receiving from the validation service endpoint the configuration map with a new environmental variable responsive to the validation service endpoint validating the configuration map; and
    transmitting the configuration map without the new environmental variable responsive to the validation service endpoint not validating the configuration map.

2. The method of claim 1, further comprising:
    validating the configuration map at the validation service endpoint using a validation script.

3. The method of claim 1, further comprising:
    transmitting another configuration map responsive to the validation service endpoint not validating the configuration map.

4. The method of claim 1, further comprising:
    receiving a vulnerability report on a new virus by the validation service endpoint.

5. The method of claim 4, further comprising:
    modifying a validation requirement by the validation service endpoint in response to receiving the vulnerability report on the new virus.

6. The method of claim 1, further comprising:
    omitting the new environmental variable in the configuration map from the validation service endpoint in response to the validation service endpoint not validating the configuration map.

7. The method of claim 1, further comprising:
    receiving a vulnerability report on a new algorithm by the validation service endpoint.

8. The method of claim 7, further comprising:
    modifying a validation requirement by the validation service endpoint in response to receiving the vulnerability report on the new algorithm.

9. The method of claim 1, further comprising:
    adding a validation requirement for the configuration map by the validation service endpoint to prevent a new algorithm from being validated.

10. The method of claim 1, further comprising:
    transmitting the configuration map including a username and a port by the container manager to attempt to validate the username and the port at the validation service endpoint.

11. The method of claim 1, further comprising:
    transmitting the configuration map including a password and a uniform resource locator (URL) by the container manager to attempt to validate the password and URL at the validation service endpoint.

12. The method of claim 1, further comprising:
    transmitting the configuration map including a token and a certificate by the container manager to attempt to validate the token and the certificate at the validation service endpoint.

13. The method of claim 1, further comprising:
    transmitting another configuration map with at least one different variable than the first configuration map to the validation service endpoint responsive to the validation service endpoint not validating the first configuration map transmitted.

14. The method of claim 1, further comprising:
    transmitting a second configuration map to the validation service endpoint in response to the validation service endpoint modifying a validation requirement for the configuration map transmitted.

15. The method of claim 14, further comprising:
    transmitting the second configuration map including a username, password, uniform resource locator (URL), token, and a certificate by the container manager to attempt to validate the username, password, URL, token and certificate at the validation service endpoint.

16. A computer usable program product comprising one or more computer-readable storage devices, and computer-usable code stored on at least one of the one or more storage devices, the computer-usable code comprising:
program instructions to compile a configuration map onto a client device, the configuration map to be transmitted to a container manager within a network;
program instructions to transmit the configuration map to the container manager managing a cluster of containers within the network;
program instructions to transmit the configuration map from the container manager to a validation service endpoint to attempt to validate the configuration map compiled;
program instructions to cause, responsive to the transmitting the configuration map from the container manager, at the validation service endpoint, a determination whether the configuration map should be validated by the validation service endpoint;
program instructions to receive from the validation service endpoint the configuration map with a new environmental variable responsive to the validation service endpoint validating the configuration map; and
program instructions to transmit the configuration map without the new environmental variable responsive to the validation service endpoint not validating the configuration map.

17. The computer usable program product of claim 16, wherein the computer-usable code is stored in a computer-readable storage device in a data processing system, and wherein the computer-usable code is transferred over a network from a remote data processing system.

18. The computer usable program product of claim 16, wherein the computer-usable code is stored in a second computer readable storage device in a server data processing system, and wherein the computer usable code is downloaded over a network to a remote data processing system for use in a third computer readable storage device associated with remote data processing system.

19. A computer system comprising one or more processors, one or more computer-readable memories, and one or more computer-readable storage devices, and computer-usable code stored on at least one of the one or more storage devices for execution by at least one of the one or more processors via at least one of the one or more computer-readable memories, the computer-usable code comprising:
program instructions to compile a configuration map onto a client device, the configuration map to be transmitted to a container manager within a network;
program instructions to transmit the configuration map to the container manager managing a cluster of containers within the network;
program instructions to transmit the configuration map from the container manager to a validation service endpoint to attempt to validate the configuration map compiled;
program instructions to cause, responsive to the transmitting the configuration map from the container manager, at the validation service endpoint, a determination whether the configuration map should be validated by the validation service endpoint;
program instructions to receive from the validation service endpoint the configuration map with a new environmental variable responsive to the validation service endpoint validating the configuration map; and
program instructions to transmit the configuration map without the new environmental variable responsive to the validation service endpoint not validating the configuration map.

\* \* \* \* \*